| United States Patent [19] | [11] 4,361,252 |
|---|---|
| Black et al. | [45] Nov. 30, 1982 |

[54] FLOATING SEAL FOR WEATHERPROOF HOUSING

[75] Inventors: Richard I. Black, Closter, N.J.; Alfred L. Ehrenfels, Cheshire; Michael R. Marks, Trumbull, both of Conn.

[73] Assignee: Harvey Hubbell Incorporated, Orange, Conn.

[21] Appl. No.: 286,285

[22] Filed: Jul. 23, 1981

[51] Int. Cl.³ .............................................. B65D 53/00
[52] U.S. Cl. .................................... 220/344; 220/242; 220/295; 220/378
[58] Field of Search ............... 220/241, 242, 295, 344, 220/329, 378; 215/350; 174/66, 67

[56] References Cited

U.S. PATENT DOCUMENTS

| 2,722,338 | 11/1955 | Eshlaugh | 220/295 |
| 3,399,005 | 8/1968 | MacDonnell | 220/344 |
| 3,777,926 | 12/1973 | Stieler | 220/344 |

Primary Examiner—George T. Hall
Attorney, Agent, or Firm—Jerry M. Presson; Walter C. Farley

[57] ABSTRACT

A wiring device with a pivotable and rotatable cover wherein the cover has a seal which is movable relative to the cover. The seal includes a resilient ring or disk carried by a stiff supporting disk loosely retained in the cover. When the cover is closed and rotated to tighten the cover on the device, the seal frictionally engages the mouth of the device and the cover rotates relative to the seal, avoiding damage to the seal.

10 Claims, 5 Drawing Figures

FLOATING SEAL FOR WEATHERPROOF HOUSING

This invention relates to a wiring device of the co-called "weatherproof" type and more particularly to a wiring device of the type having a hinged, rotatable cover which can be closed to prevent the entry of undesirable matter into the housing.

BACKGROUND OF THE INVENTION

This invention involves devices such as that shown in U.S. Patent application Ser. No. 237,889, entitled Detenting Lift Cover, Ehrenfels et al, filed Feb. 25, 1981, which involved a generally cylindrical housing for receiving a receptacle or other electrical wiring device which in intended for use in environments where it is subject to undesirable, extraneous matter.

In that application there is disclosed a wiring device housing having a rim or flange at its open end, the flange having thread-like camming surfaces. A cover is hingedly connected to the housing by a L-shaped arm, one end of which is pivotally attached to the exterior of the housing and the other end of which is coupled to the center of a generally circular cover in a manner permitting the cover to be rotated relative to the arm and the housing. The cover has a skirt extending axially toward the housing when the cover is closed, the inner diameter of the skirt being larger than the housing flange. Mating cam surfaces are formed on the skirt so that, after the cover is closed, it can be rotated to engage the cam surfaces and lock the cover tightly in place.

In order to complete the sealing of the housing and protect the interior thereof from extraneous foreign matter, such as water, rain and solid particulate matter, an elastomeric seal is adhered to the inner surface of the cover, the seal being positioned and dimensioned to abut the axially facing distal surface of the housing. The seal is commonly a flat, annular ring of spongy, rubber-like material which is compressed between underlying surfaces of the cover and housing, respectively, when the cover is closed to effect the sealing of those surfaces.

It has been found, however, that under some conditions the seal frictionally engages the abutting housing surface and resists sliding as the cover is rotated. Particularly when the coefficient of friction increases as the result of high temperatures or foreign particulate material in the housing or imperfections in the housing, the seal "grabs" the underlying housing surface upon cover rotation and may be pulled away from the underlying surface of the cover or wrinkled or folded, especially after repeated openings and closings of the cover. Thereafter, the seal does not seat properly, interrupting an otherwise continuous seal. In extreme cases, the seal can even be pulled completely loose and lost, in which case the capability of the wiring device to prevent entry of extraneous foreign matter is seriously diminished.

BRIEF DESCRIPTION OF THE INVENTION

An object of the present invention is to provide an improved seal structure for an electrical wiring device of the weatherproof type.

A further object is to provide a seal for a housing cover of a wiring device wherein a sealing ring or disk is carried by a supporting body loosely retained in the cover so that it is free to rotate relative thereto and maintain and maintain a good, continuous seal after repeated usage.

Briefly described, the invention includes an improved seal structure for a weatherproof type of wiring device wherein the housing device has an open end with a generally circular mouth, the cover is generally circular and has an inner surface to close the mouth, the assembly further including a hinge arm hingedly attached to an exterior portion of the housing and pivotally attached to the cover so that the cover is rotatable relative to the arm and swingable between open and closed positions, the improvement comprising a generally circular thin, stiff disk; means on the inner surface of said cover comprising at least one radially extending recess for receiving opposite peripheral portions of said disk to loosely retain said disk in generally parallel relationship with said cover with one major surface of said disk facing said cover and the other major surface thereof exposed; and an elastomeric generally circular body adhered to said exposed major surface, said body being positioned and dimensioned to engage the mouth or face of said housing when the cover is swung to its closed position so that, when said cover is closed and rotated, said elastomeric body can frictionally engage said mouth and remain in position while said cover rotates relative thereto.

In order that the manner in which the foregoing and other objects are attained in accordance with the invention can be understood in detail, particularly advantageous embodiments thereof will be described with reference to the accompanying drawings, which form a part of this specification, and wherein.

Figure 1:
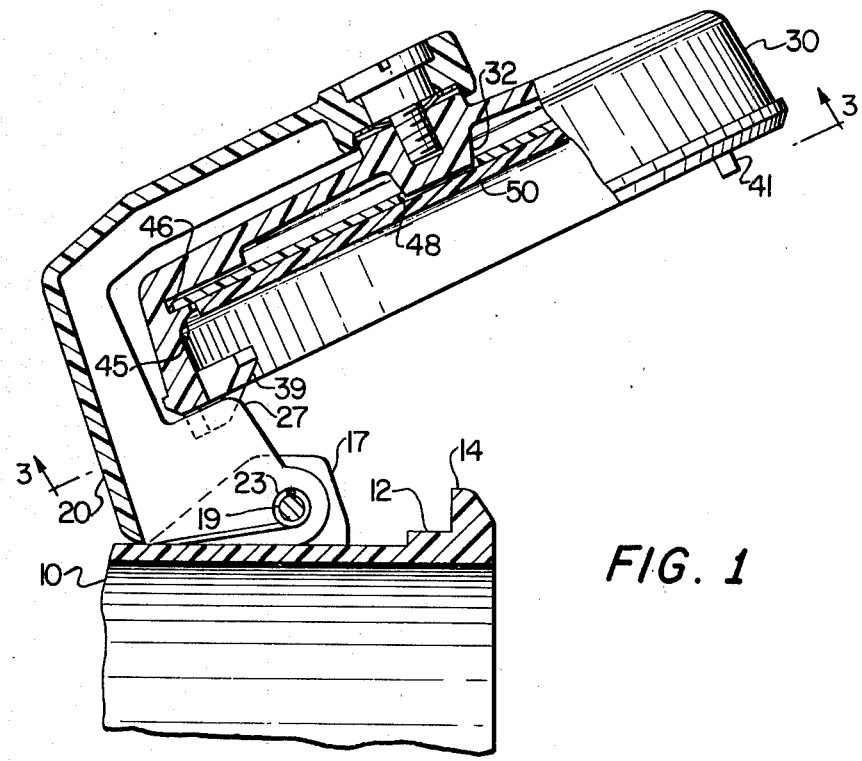
FIG. 1 is a partial side elevation, in section, of a housing and cover in its open position, the cover incorporating one embodiment of a seal arrangement in accordance with the present invention.
Figure 2:
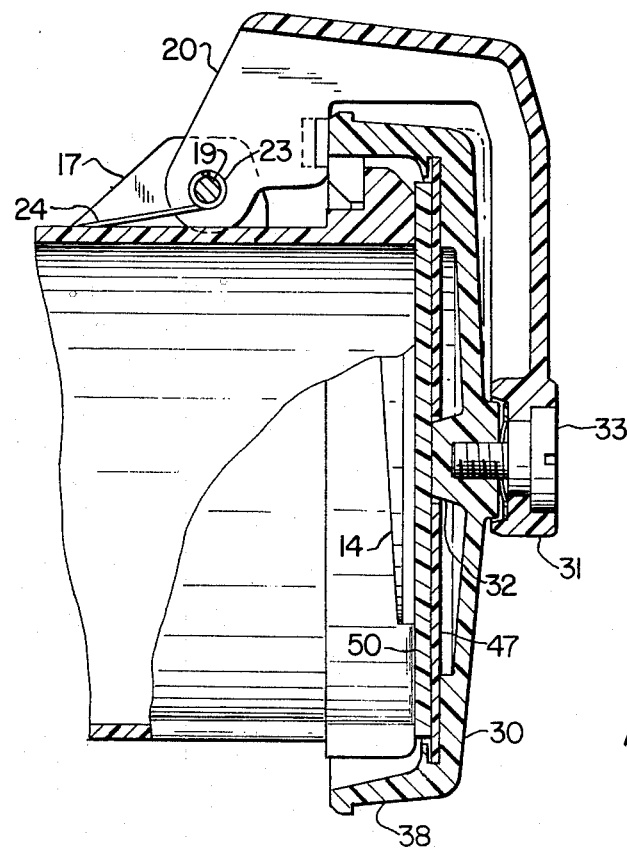
FIG. 2 is a partial side elevation, in section, of the structure of FIG. 1.
Figure 3:
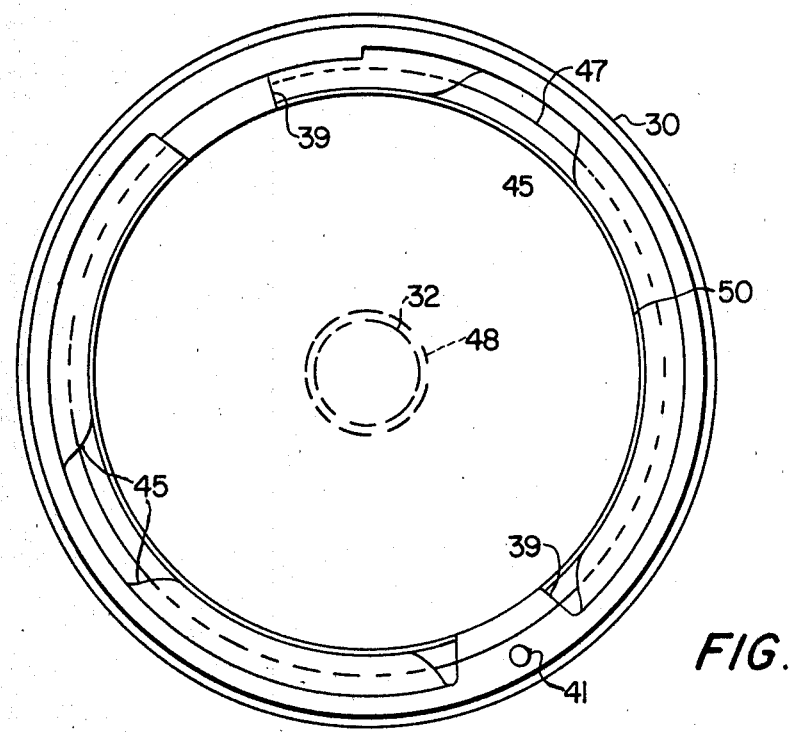
FIG. 3 is an end elevation of the interior portion of the cover and seal structure shown in FIGS. 1 and 2.

As shown in FIGS. 1, 2 and 3, the device includes a generally cylindrical housing 10 designed and dimensioned to receive a mating electrical connector or some other form of mating wiring device which is to be accessable but protected from weather and other adverse ambient conditions. Near the mouth of the housing the wall thereof is thickened at 12 and directly adjacent the mouth are two circularly extending, radially protruding flanges 14 each of which occupies about 120° of arc. The flanges are diametrically opposite each other, leaving gaps of about 50° and 25° on opposite sides of the housing mouth. Each flange 14 has a surface facing axially away from the open end of the housing, which surface is inclined relative to the housing axis as illustrated in FIG. 2 thereby forming a cam surface on each flange similar to a portion of a screw thread but being generally planar rather than being helical.

Fixedly attached to the outside of the housing 10 are two lugs 17 which extend outwardly in parallel, spaced relationship from the outer surface of the housing, these lugs being provided with coaxially aligned openings to receive the ends of an axial pin 19. An arm 20 is mounted for pivotal movement about the axis of axle 19, the arm being generally J-shaped in side elevation and the longer leg and bottom portion of the J being U-shaped in cross-section.

A torsion coil spring 23 surrounds axle 19, one end 24 of the spring 23 bearing against the body of the housing 10 and the other end resting on a shelf or rib, or being bent to enter a small hole in the arm so that the spring urges the arm toward its closed position, i.e., clockwise as seen in FIGS. 1 and 2.

The walls 27 forming the short leg of the J are substantially identical in shape in side elevation in the embodiment shown, one wall including a surface which faces toward a generally circular, cup-shaped cover 30. The distal end of the arm 20 is provided with a boss 31 to which the center of the cover is pivotably connected. This connection includes a thickened central body 32 which has an internally threaded, axially extending opening to receive the externally threaded end of a screw 33 passing through boss 31. It will be observed that screw 33 has an enlarged head portion which abuts a shoulder in the opening in boss 31 to limit its penetration into boss 31. It will also be observed that boss 31 has, on its inner side facing the cover, an annular recess which receives a spring 36 lying between that recess and the outer annular surface of thickened portion 32 of the cover. Spring 36 acts as a compression spring, tending to urge the cover 30 away from boss 31 and holding screw 33 firmly in its seated position. The spring is normally not fully compressed, hereby permitting limited tilted movement of the cover relative to boss 31 and arm 20.

The cover also includes an annular skirt portion 38 which is dimensioned to surround housing 10 and its flanges, the skirt having radially inwardly extending flanges 39, each of these flanges occupying approximately 20° of arc at their inner ends and tapering outwardly slightly to merge with the interior of skirt 38. A stop pin 41 protrudes axially from the skirt at approximately the center of one of the flanges. It will be observed that flanges 39 easily fit within the arcuate gaps between flanges 14 on housing 10.

Adjacent one flange 39 on the axially facing surface of skirt 38 is a fixedly attached cam surface and stop structure which cooperates with a shoulder on wall 27 to form a detent structure. This arrangement includes a cam member which protrudes axially from the skirt and has a gently sloping surface, an intermediate portion and a steeper slope. These and other surfaces define a recess dimensioned to receive wall 27 and to positively limit rotation of cover 30 in a counterclockwise direction. This structure and the functions thereof are described more fully in application Ser. No. 237,889, previously mentioned.

Within cover 30, near the base of skirt 38, are a plurality of radially inwardly extending protrusions 45 which can be a single, continuous annular rib or which, as shown in FIG. 3, can be discontinuous in the circular direction. Protrusion or protrusions 45 define an annular groove or gap 46 which lies in a common plane and which receives the periphery of a disk 47. As will be seen in FIGS. 1 and 2, the thickness of disk 47 is less than the axial dimension of gap 46, thereby permitting some movement of the disc with respect to the gap. Additionally, the outer diameter of disk 47 is less than the diameter of groove 46, permitting some lateral play of the disc therein as well. Further, there is nothing to prevent rotational movement of the disc relative to the gap and, therefore, the remainder of the cover. Disk 47 is provided with a central opening 48 to receive that portion of thickened portion 32 at the center of the cover which protrudes into the plane occupied by the disk.

A seal 50 is adhered to the exposed surface of disk 47 and extends across substantially the entire interior of the cover, but the diameter of disc 50 is smaller than the circle defined by the inner limits of protrusions 45 so as not to inhibit the freedom of movement of disk 47 in groove 46.

Disk 47 is preferably made of a relatively slippery insulative material such as nylon and the seal 50 is preferably a rubber material which is bonded to the nylon using a cyanoacrylate ester which is a known instant bonding material. Glass fibers are preferably incorporated in the nylon because it is relatively difficult with state-of-the-art bonding materials to achieve the desired bonding of rubber to nylon. Using glass reinforced nylon, the disk 47 is a relatively rigid, stiff member, but is sufficiently flexible so that it can be bent or deformed enough to snap the periphery thereof into annular groove 46. As will be recognized, protrusions 45 need extend inwardly only far enough to prevent disk 47 from falling out of the cover and, once the disk is installed, it holds itself and seal 50 in the proper position so that when the cover is moved to its closed position, shown in FIG. 2, the seal engages the mouth of housing 10 and disk 47 is pressed to its farthest point of movement toward the disk-like portion of cover 30.

Of particular significance is the ability of disk 47 and seal 50 to move relative to cover 30 when the cover is in the closed position. When the cover and seal assembly is moved to the position shown in FIG. 2, and when the seal frictionally engages the mouth of housing 10, the cover is rotated in the clock-wise direction to cause the cam surfaces of flanges 39 of the cover to engage the cam surfaces of flanges 14 on the housing, thereby locking the cover in its closed and fully locked position. During this rotation, the cover is moved inwardly by the camming action between it and the housing and the friction developed between the mouth of housing 10 and the seal 50 can prevent rotation of the seal and disk 47, allowing both the seal and the disk to remain fixed relative to the housing while the cover rotates. This prevents any damage to the seal while the cover is cammed inwardly to apply the substantial perpendicular forces directed to the disk and seal to effect the requisite sealing.

Figure 4:
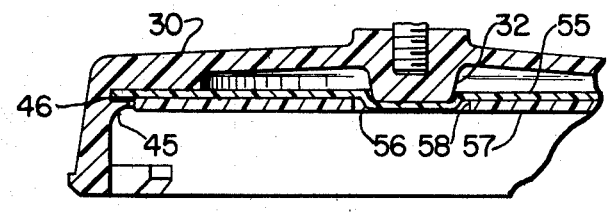
FIG. 4 is a partial side elevation, in section, of a further embodiment of the invention.
Figure 5:
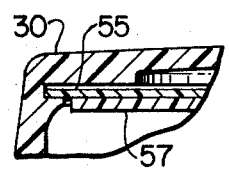
FIG. 5 is an enlarged fragmentary view of a portion of the embodiment of FIG. 4.

A further embodiment of a structure in accordance with the invention is shown in FIGS. 4 and 5, FIG. 4 showing only a portion of the cover 30 which can be identical to that described in connection with FIGS. 1–3. The cover is, as previously described, formed with protrusion 45 defining a gap or groove 46 which, in this embodiment, receives a disk 55. In this embodiment, disk 55 is not provided with a central opening. Rather, the central portion of the disk is formed with an axially off-set central portion 56 which partially surrounds the end of thickened portion 32 of the cover when the disk is pushed to its position closest to the disk-like section of the cover. A seal 57 is adhered to the exposed surface of disk 55, seal 57 having a central opening 58 to permit portion 56 to protrude therethrough without interference. Because the central portion of seal 57 does not contact the housing itself, and because opening 58 is closed by the continuous off-set portion 56 of disk 55, no degradation or interruption of the sealing function results. As seen in FIG. 5, when the cover is in an open position, the disc and seal portion of the assembly can move axially away from the disc-like portion of the cover, the same freedom of movement being provided as described in connection with FIGS. 1–3.

While certain advantageous embodiments have been chosen to illustrate the invention it will be understood by those skilled in the art that various changes and modifications can be made therein without departing from the scope of the invention as defined in the appended claims.

What is claimed is:

1. A wiring device comprising a housing with an open, generally circular mouth, and a cover assembly therefor, the cover assembly including a cover and a hinge arm pivotally attached to an exterior portion of the housing and to the cover so that the cover is rotatable relative to the arm and pivotable between open and closed positions with respect to the mouth of the housing, the improvement comprising:

a generally circular and relatively thin, stiff disk;
means on the inner surface of said cover for receiving peripheral portions of said disk to loosely retain said disk in generally parallel relationship with said cover with one major surface of said disk facing said cover and the other major surface thereof exposed when the cover is pivoted to the open position; and
an elastomeric generally circular body adhered to said exposed major surface, said body being positioned and dimensioned to engage the mouth of said housing when the cover is pivoted to its closed position so that, when said cover is closed and rotated, said elastomeric body can frictionally engage said mouth and remain substantially in position while said cover rotates relative thereto.

2. A device according to claim 1 wherein said means for receiving includes
a plurality of radially inwardly extending projections defining a plurality of arcuate, concentric circularly spaced grooves of substantially the same radius, said grooves together defining an interrupted annular recess for receiving said disk.

3. A device according to claim 1 wherein said means for receiving includes
means defining a substantially continuous generally annular recess extending radially around the interior of said cover to receive the periphery of said disk.

4. A device according to claim 3 wherein said cover includes a generally circular portion and an axially extending skirt portion, said annular recess being formed on said skirt portion.

5. A device according to claim 1 wherein said elastomeric body is in the form of an annular ring.

6. A device according to claim 1 wherein said cover includes
a generally circular portion having a central boss protruding from the inner surface thereof;
and said disk includes means defining a circular central opening therein, said opening being dimensioned to loosely surround said boss.

7. A device according to claim 6 wherein said disk is composed of glass-reinforced nylon.

8. A device according to claim 6 wherein said disk floats in said cover when said cover is in the open position.

9. A device according to claim 8 wherein the diameter of said disk is greater than the diameter of said ring.

10. A device according to claim 9 wherein said disk is formed of a glass-reinforced nylon composition.

* * * * *